Aug. 5, 1941.   G. E. MOTZER   2,251,370
HEATER FOR MOTOR VEHICLES
Original Filed Feb. 7, 1939
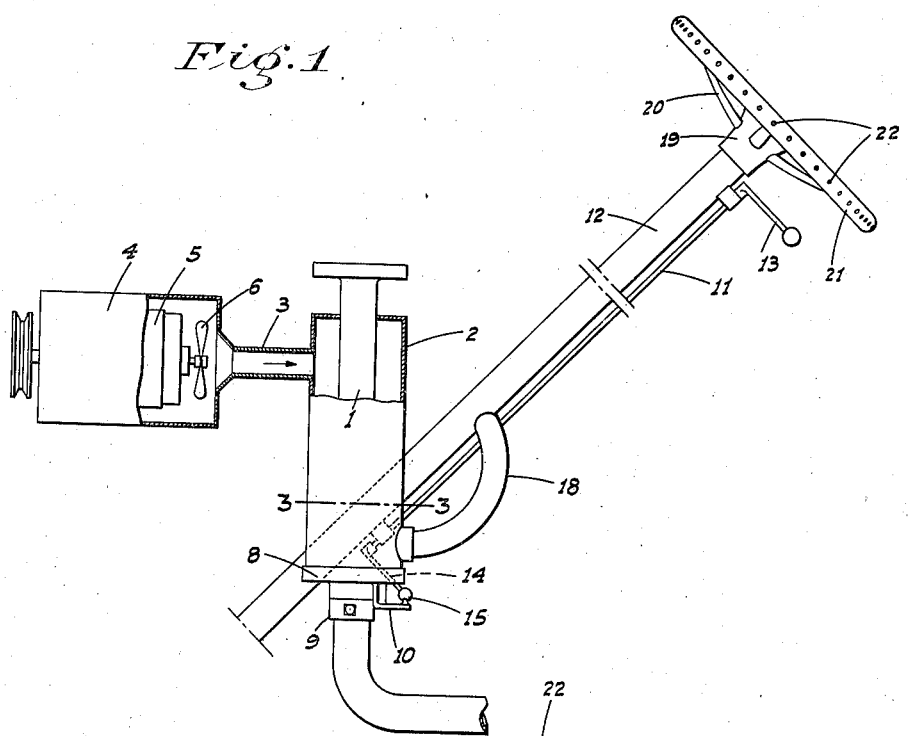
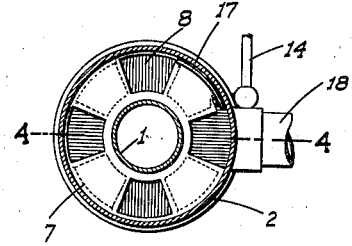
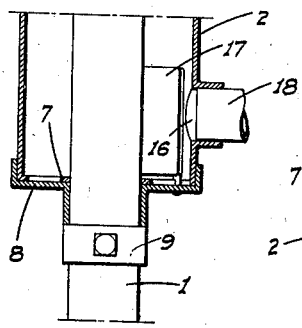
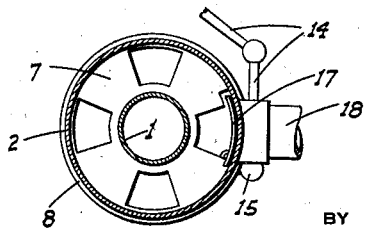
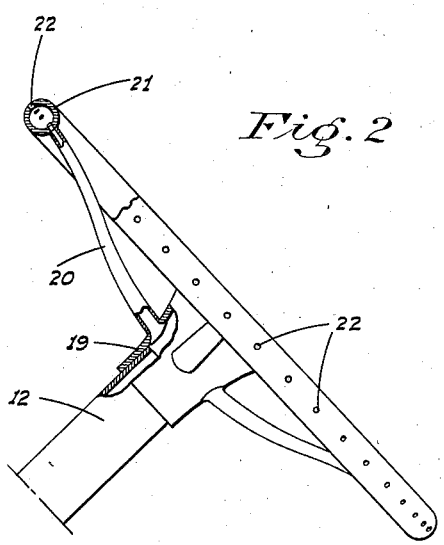
INVENTOR
G.E.Motzer
BY
ATTORNEY Patented Aug. 5, 1941

2,251,370

UNITED STATES PATENT OFFICE 2,251,370

HEATER FOR MOTOR VEHICLES

George E. Motzer, Vallejo, Calif.

Substituted for abandoned application Serial No. 255,062, February 7, 1939. This application May 2, 1941, Serial No. 391,570

2 Claims. (Cl. 237—12.3)

This invention relates in general to an improvement in motor vehicle equipment, and in particular is directed to an improved hot air heater especially arranged for discharge adjacent the operator, whereby to provide greater comfort and protection against cold.

This application is a substitution for my abandoned application, Ser. No. 255,062, filed February 7, 1939.

The principal object of the invention is to provide in a motor vehicle—such as an automobile, tractor, truck or the like—a hot air heater which is arranged to discharge heated air from and about the steering wheel of such vehicle and to thus assure warmth of the operator's hands as well as his person. The operator is thus able to control the vehicle with greater ease and safety and in comfort.

An additional object of the invention is to provide, in combination in a motor vehicle, an air heating mechanism and a hollow steering wheel having a series of perforations therethrough; there being passage means between the heater and the hollow wheel whereby heated air may be supplied to such hollow steering wheel.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Figure 1 is a diagrammatic elevation, partly in section, of the assembly.

Figure 2 is an enlarged elevation, partly in section, of the hollow steering wheel and its perforate rim.

Figure 3 is a cross section on line 3—3 of Fig. 1, and illustrating the rotary by-pass damper closed.

Figure 4 is an enlarged fragmentary vertical section on line 4—4 of Fig. 3.

Figure 5 is a view as in Fig. 3, but with the rotary by-pass damper open.

Referring now more particularly to the characters of reference on the drawing, the numeral 1 indicates the exhaust pipe of a motor vehicle and such pipe, preferably adjacent the engine, is surrounded by a heat exchange or hot air jacket 2. Adjacent its upper end the jacket is provided with an air intake conduit 3 which may open toward the air blast of the engine fan or, as shown, be connected in communication with the housing 4 of an air cooled electrical generator 5 as commonly used to generate electricity for ignition and lighting; the generator including a fan or impeller 6 in said housing.

The lower end of the jacket is formed with a damper which comprises a fixed plate 7 having openings therethrough and a rotary member 8 supported by collar 9 on pipe 1 and cooperating with plate 7; member 8 having openings which register with the openings in plate 7 only when the plate and member are in a certain relative position. An arm 10 depends from the rotary member 8 and is actuated by the operator of the motor vehicle, to open or close the damper, by means of mechanism which includes a rod 11 extending along substantially the full length of the hollow steering column 12, a radial handle 13 on the upper end of the rod and a link and arm unit 14 connected between the lower end of the rod and a ball and socket connection 15 on said arm 10.

The hot air jacket 2 is formed with an air outlet port 16 in the side wall thereof adjacent but above the damper; such port being open when the damper is closed, and closed by means of an upstanding shutter 17 on rotary member 8 when the damper is open and the hot air by-passing therethrough. A conduit 18 connects between port 16 in jacket 2 and the interior of the hollow steering column 12.

The steering wheel is of special construction and comprises a hub 19 in communication with the steering column 12, hollow spokes 20 leading from the hub to and communicating with a hollow rim 21 having a series of perforations 22 therethrough to its periphery.

Operation

When the damper is closed and port 16 open, air under forced draft enters the jacket 2 where the air is heated and thence passed through conduit 18, steering column 12, hub 19, and spokes 20 into the hollow rim 21 of the steering wheel and from which rim the air escapes through perforations 22. As the heated air escapes from the rim, it warms the operator's hands and then passes into the adjacent atmosphere and provides a warmth about his person, and, in closed vehicles, about other persons therein.

To close port 16 and open the by-pass damper, the operator need only manipulate handle 13.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. The combination with a motor vehicle including an exhaust pipe, and a housed, air-cooled electrical generator having a driven fan, there being an air outlet opening in the generator housing; of a steering wheel having a hollow rim, a hot air jacket surrounding said pipe, means to feed heated air from the jacket to said hollow rim of the steering wheel, and an air conduit connected between the air outlet opening in the generator housing and said jacket.

2. In a motor vehicle heater including a hot air jacket adapted to surround the exhaust pipe of the vehicle, said jacket having a port therein, a conduit leading from said port and arranged to feed heated air from said jacket into the vehicle, a damper unit associated with said jacket and operative to shut off the conduit from the jacket and to bypass the heated air from the latter, and manually actuated control means operatively connected with the damper unit; said damper unit forming one end of the jacket and comprising a fixed plate surrounding the exhaust pipe and having an opening therethrough, a rotary plate surrounding the exhaust pipe in face to face engagement with said fixed plate, the rotary plate having an opening adapted to register with the opening in the fixed plate only when said plates are in predetermined position, said manually actuated control means cooperating with said rotary plate, and a shutter mounted on the rotary plate, said shutter being arranged relative to the jacket to close said port when the openings in the plates are in said predetermined position.

GEORGE E. MOTZER.